(12) United States Patent
Myerberg et al.

(10) Patent No.: US 11,618,212 B2
(45) Date of Patent: Apr. 4, 2023

(54) ADDITIVE FABRICATION OF SINTERABLE METALLIC PARTS VIA APPLICATION OF DIRECTED ENERGY

(71) Applicant: Desktop Metal, Inc., Burlington, MA (US)

(72) Inventors: Jonah Samuel Myerberg, Lexington, MA (US); Anastasios John Hart, Waban, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/824,987

(22) Filed: Mar. 20, 2020

(65) Prior Publication Data

US 2020/0298475 A1 Sep. 24, 2020

Related U.S. Application Data

(60) Provisional application No. 62/821,288, filed on Mar. 20, 2019.

(51) Int. Cl.
| | | |
|---|---|---|
| *B29C 64/153* | (2017.01) | |
| *B29C 64/264* | (2017.01) | |
| *B29C 64/255* | (2017.01) | |
| *B29K 91/00* | (2006.01) | |
| *B29K 23/00* | (2006.01) | |

(52) U.S. Cl.
CPC .......... *B29C 64/153* (2017.08); *B29C 64/255* (2017.08); *B29C 64/264* (2017.08); *B29K 2023/06* (2013.01); *B29K 2023/12* (2013.01); *B29K 2091/00* (2013.01)

(58) Field of Classification Search
None
See application file for complete search history.

(56) References Cited

U.S. PATENT DOCUMENTS

| | | | | |
|---|---|---|---|---|
| 5,076,869 A * | 12/1991 | Bourell | ................... | C23C 24/10 264/497 |
| 5,745,834 A * | 4/1998 | Bampton | .............. | B22F 1/0059 419/37 |
| 6,007,764 A * | 12/1999 | Benda | ................... | B29C 64/153 419/36 |
| 6,048,667 A * | 4/2000 | Eldin | ..................... | G03F 7/031 430/281.1 |
| 6,048,954 A * | 4/2000 | Barlow | ............. | C04B 35/63444 526/328.5 |
| 6,365,093 B1 * | 4/2002 | Ryang | .................. | B22F 1/0059 419/36 |

(Continued)

*Primary Examiner* — Timothy Kennedy
(74) *Attorney, Agent, or Firm* — Wolf, Greenfield & Sacks, P.C.

(57) ABSTRACT

According to some aspects, techniques are provided for fabricating sinterable metallic parts through the application of directed energy to a build material. In particular, applying energy to a build material comprising a polymer mixed with a metal powder may cause the polymer to form a cohesive structure with the metal powder. As a result, the polymer acts as a "glue" to produce a metallic green part without local melting of the metal. The green part may subsequently be sintered to remove the polymer and produce a fully dense metal part. Optionally, a step of debinding may also be performed prior to, or simultaneously with, sintering.

15 Claims, 12 Drawing Sheets

(56) References Cited

U.S. PATENT DOCUMENTS

| | | | |
|---|---|---|---|
| 2006/0251535 A1* | 11/2006 | Pfeifer | B29C 64/135 419/36 |
| 2007/0183918 A1* | 8/2007 | Monsheimer | C04B 35/64 419/1 |
| 2014/0050921 A1* | 2/2014 | Lyons | B29C 64/153 428/372 |
| 2016/0271875 A1* | 9/2016 | Brown, Jr. | B29C 64/153 |

* cited by examiner

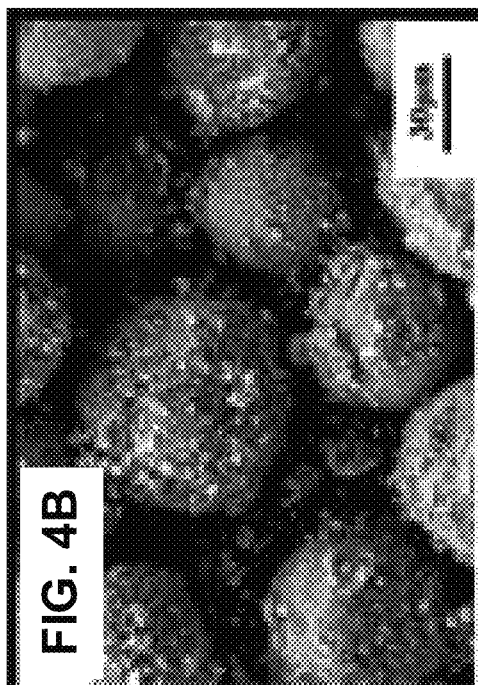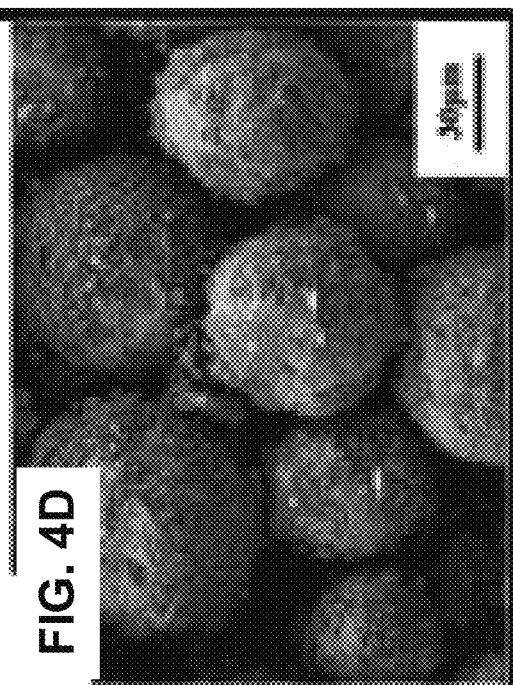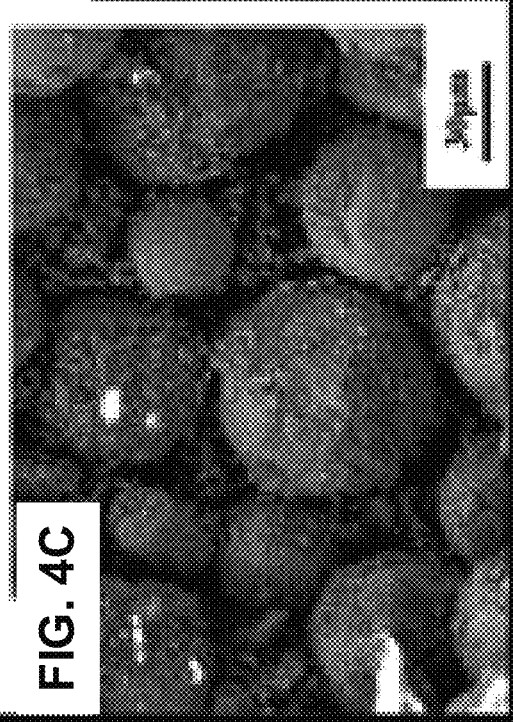

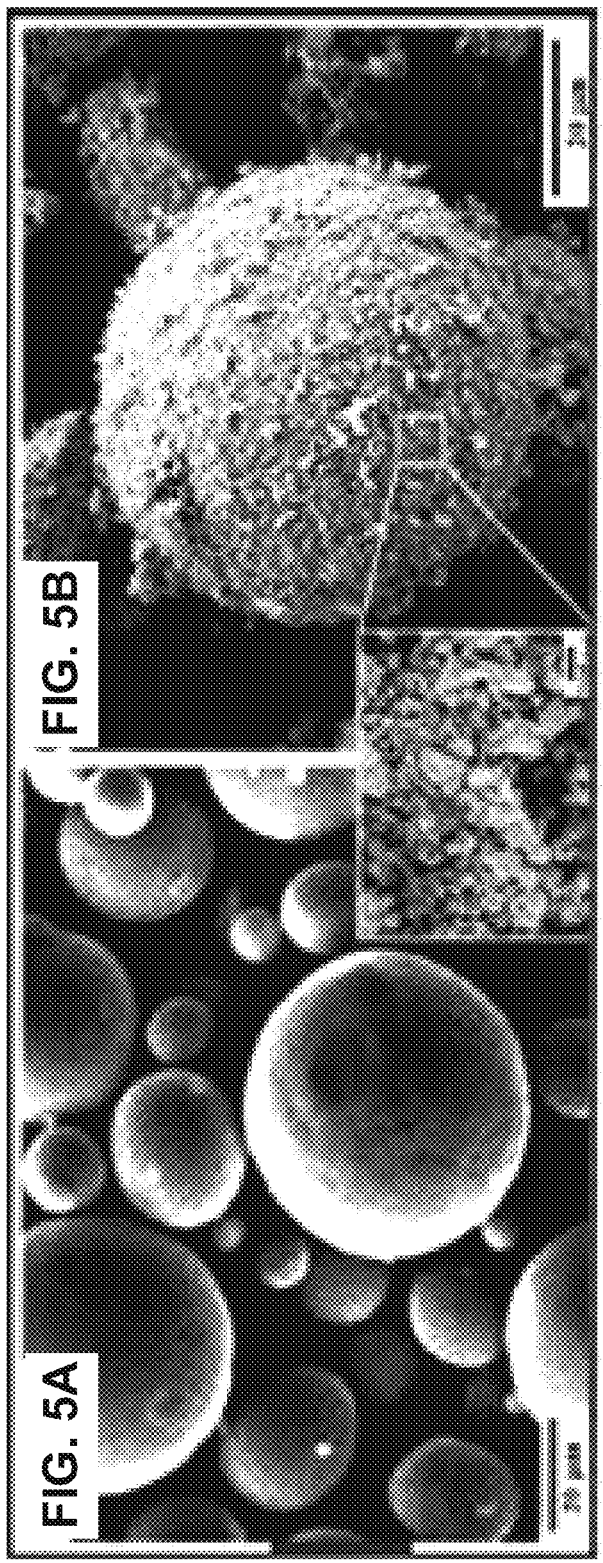
FIG. 5A Uncoated metal powder
FIG. 5B Coated metal powder

ADDITIVE FABRICATION OF SINTERABLE METALLIC PARTS VIA APPLICATION OF DIRECTED ENERGY

CROSS REFERENCE TO RELATED APPLICATIONS

The present application claims the benefit under 35 U.S.C. § 119(e) of U.S. Provisional Application No. 62/821,288, filed Mar. 20, 2019, which is hereby incorporated by reference in its entirety

BACKGROUND

Additive fabrication, e.g. 3-dimensional (3D) printing, provides techniques for fabricating objects, typically by causing portions of a building material to solidify at specific locations. Additive fabrication techniques may include techniques categorized as vat photopolymerization, powder bed fusion, binder jetting, material jetting, sheet lamination, material extrusion, directed energy deposition, or combinations thereof. Many additive fabrication techniques build parts by forming successive layers, which are typically cross-sections of the desired object. Typically each layer is formed such that it adheres to either a previously formed layer or a substrate upon which the part is built.

In some additive fabrication technologies, metallic parts may be fabricated by melting portions of a metal powder to create fully dense metal parts. For instance, a layer of metal powder may be deposited and portions melted to form a region of solid metal, then a subsequent layer of metal powder may be deposited over the first layer and additional regions of metal melted in contact with the melted portions in the first layer, and so on. At the end of such a process, the metal parts are disposed within a volume of powder, which must be removed to retrieve the parts.

SUMMARY

According to some aspects, a method is provided of fabricating an object via additive fabrication, the method comprising depositing a build material into a build region of an additive fabrication device, the build material comprising a powder including a metal and a polymer, and directing, by the additive fabrication device, energy onto the deposited build material to cause at least some of the polymer to adhere to other portions of the polymer and/or the metal.

According to some aspects, a kit is provided for producing build material for an additive fabrication device in which solid objects are formed by directing energy onto the build material, the kit including a powdered polymer that, when mixed with a metal powder, produces polymer-coated metal particles, and one or more flow improvers and/or pigments.

According to some aspects, an additive fabrication device is provided for producing sinterable metallic parts from a build material, the additive fabrication device comprising a material deposition mechanism configured to deposit build material into a build region, wherein the build material comprises a powder including a metal and a polymer, and at least one energy source configured to direct energy onto the deposited build material to cause at least some of the polymer to adhere to other portions of the polymer and/or the metal.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 4A-4D are photographs of a build material in which metal powder particles are coated with a polymer, according to some embodiments;

FIGS. 5A and 5B contrast metal powder particles with and without a polymer coating, according to some embodiments;

DETAILED DESCRIPTION

Figure 1:
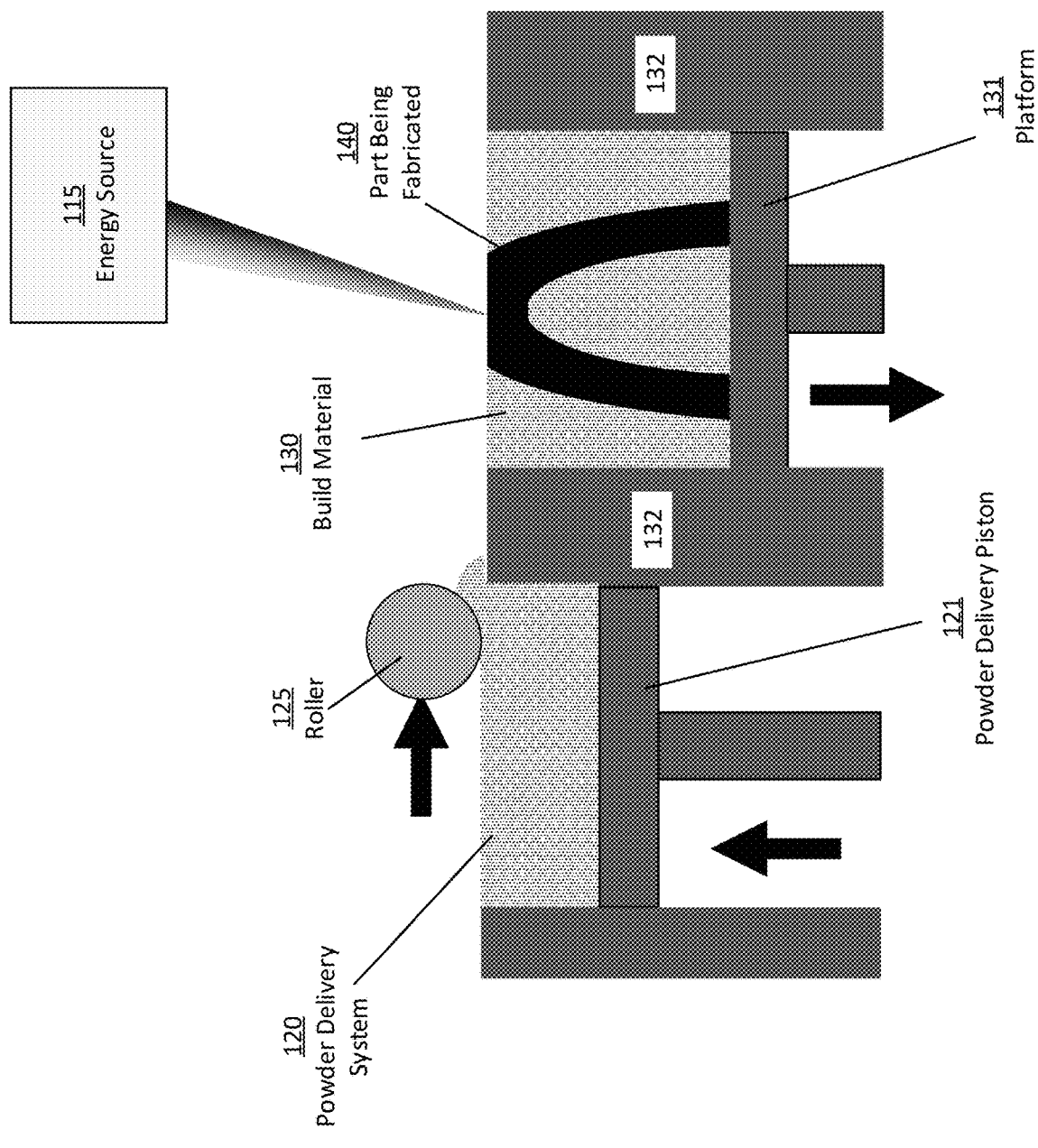
FIG. 1 illustrates an additive fabrication device suitable for practicing aspects of the present application.

As discussed above, some conventional metallic additive fabrication techniques may apply energy to a metal powder to melt the powder and thereby create solid regions of metal. Such techniques may, however, present safety concerns due to the explosive potential of metal powders. As a result, such techniques are generally employed in inert environments requiring a great deal of associated infrastructure. Moreover, the energy required to melt metal is comparatively high, leading to a slow and expensive fabrication process.

Another additive fabrication technology suitable for fabricating metal parts is Binder Jetting, in which metal parts are fabricated through the application of a binder ink to a metal powder. The binder ink allows the part geometry to be built up without locally melting the metal by effectively "gluing" portions of metal powder together. Subsequently, the resulting "green part" is sintered in a sintering furnace to produce a fully dense metal part. The green part can be very fragile, however, and in some cases a Binder Jetting process may apply heat to the powder to dry and strengthen the green part prior to removal of the powder and sintering. In addition, some Binder Jetting processes may arrange a print head very close to the powder (e.g., around 1 mm or less) to accurately deliver binding ink to desired locations. Such proximity can, however, cause powder to be ejected from the powder surface which can in some cases contaminate the print head and cause it to fail.

The inventors have recognized and appreciated techniques for fabricating sinterable metallic parts through the application of directed energy to a build material. In particular, the inventors have recognized that applying energy to a build material comprising a polymer mixed with a metal powder may cause the polymer to form a cohesive structure with the metal powder. As a result, the polymer acts as a "glue" to produce a metallic green part without local melting of the metal. The green part may subsequently be sintered to remove the polymer and produce a fully dense metal part. Optionally, a step of debinding may also be performed prior to, or simultaneously with, sintering.

Compared to the conventional metallic additive fabrication techniques discussed above, such an approach may be safer and cheaper than melting a metal powder because the mixture of metal powder and polymer may not present the same safely concerns as a pure metal powder, and because the energy required to melt the polymer (or otherwise cause the polymer to form a cohesive structure) may be significantly less than the energy required to melt a metal powder. Moreover, green parts produced via the techniques described herein may not be as fragile as green parts produced through application of a binder ink in Binder Jetting, and a directed energy source may be located far from the metal powder and polymer mixture, thereby mitigating the above-described issues with powder ejection in Binder Jetting.

According to some embodiments, additional advantages of the techniques described herein for fabricating sinterable metallic parts through the application of directed energy to a build material comprising a polymer mixed with a metal powder may include the following. First, the techniques described herein may enable faster fabrication of parts compared with melting a metal powder because less energy may be required to melt or otherwise transform the state of the polymer compared with the energy required to melt metal. Second, the techniques described herein may not, in contrast with techniques that melt metal powder, produce oxides of the metal which can affect the quality of the parts. The use of a comparatively lower power, lower temperature process may prevent surface passivation or other such processes from occurring. Third, the techniques described herein may have an advantage over Binder Jetting in that binder inks, and particularly the solvents in which binder inks are provided, can be reactive with metal powder such that oxides and other contaminates may be produced that can affect sintering and/or final properties of a part. Since the techniques described herein do not rely on binder inks, these issues may be mitigated or avoided.

According to some embodiments, sinterable metallic parts may be fabricated through application of directed energy to a build material comprising metal powder and a polymer in which the polymer is a coating applied to particles of the metal powder. For instance, the polymer may fully encapsulate metal powder particles, may otherwise be applied over the surface of the metal powder particles, or may comprise comparatively small polymer powder particles adhered to comparatively larger metal particles. In each of these cases, the polymer may represent a small fraction of the total solid material volume present in the build material (e.g., around 10-20% by volume).

As discussed above, application of directed energy to a build material comprising metal powder and a polymer may cause the build material to form a cohesive structure as a result of a change in the state of the polymer component. This change may occur in various ways, including but not limited to melting of the polymer, through softening of the polymer, through heat-induced polymerization (e.g., of a monomer and/or by cross-linking a polymer), through photochemical changes in the polymer caused by the application of the directed energy, or combinations thereof. As such, it will be appreciated that any suitable modification of the polymer within the build material may be produced through the application of directed energy so long as a cohesive green part is produced as a result.

According to some embodiments, the build material may comprise metal powder and one or more thermoplastics. Thermoplastic materials may exhibit desirable properties when used as a component (or components) of a build material from which sinterable metallic parts are produced. In particular, the property of a thermoplastic to soften or melt when heated may provide one pathway for the build material to form a cohesive structure as a result of a change in the state of the polymer component as discussed above. Suitable thermoplastics may include waxes or copolymers. According to some embodiments, the build material may additionally comprise one or more additives such as flow improvers or pigments.

According to some embodiments, an additive fabrication device configured to fabricate sinterable metallic parts from a build material as described herein may include various aspects tuned for fabrication. For instance, the additive fabrication device may be programmed to apply a suitable amount of directed energy to the build material at particular wavelength(s) of light, with a particular energy density, at a particular speed, etc. which are dependent upon the particular metal powder and polymer (and optionally, particular additives) that constitute elements of the build material. Similarly, software configured to generate instructions to be executed by an additive fabrication device to fabricate a sinterable metallic part may be configured to adapt the instructions based on the build material from which the part is to be fabricated.

According to some embodiments, a source of directed energy within an additive fabrication device as described herein may include any suitable source of energy, which includes visible light, infrared, ultraviolet, x-rays, an electron beam, or a combination thereof. Suitable sources of energy may include a laser, a light bar or a Digital Light Processing (DLP) device.

Following below are more detailed descriptions of various concepts related to, and embodiments of, techniques for fabricating sinterable metallic parts through the application of directed energy. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates an additive fabrication device suitable for practicing aspects of the present application. In the example of FIG. 1, additive fabrication device 100 comprises an energy source 115 configured to direct energy toward build material 130 and move over the area corresponding to a given cross-sectional area of a layer of a desired part. Application of energy from the energy source 115 to build material 130 may cause regions of the build material to form a cohesive structure as a result of a change in the state of the polymer component produced by said energy and therefore form a region of the part 140. As discussed above, various changes in state may be produced depending on the particular type of energy source and polymer.

According to some embodiments, a build process may begin with a user uploading a CAD model or models into a build preparation software. The software may lay the CAD model(s) into a build chamber volume, arranging them so that they don't interfere with one another or build chamber walls. The software may then create a stack of 2D images that represent the build area including CAD model(s) layer by layer, per a desired layer thickness. In some cases, the software may generate a plurality of tool paths that indicate how to direct energy to produce the image.

Fabrication may then proceed with the build material comprising metal powder and polymer being fed into the powder delivery system 120 as a powdered feedstock. The roller 125 may form a layer of build material 130 over a build platform 131. If an image layer contains part geometry, energy source 115 is directed over the surface of the build material 130 in the areas where part geometry is desired. According to some embodiments, the energy source 115 may be directed and concentrated in a way that will locally cause polymer in the build material to adhere to other regions of polymer and/or to the metal, but without causing the metal to soften or melt (although the metal may in some cases be heated directly by the energy source or indirectly by heat transfer from the polymer to the metal).

In the case of polymer melting, for instance, local melting of polymer adjacent to metal powder may allow the polymer to flow between metal powder particles, joining metal powder together in all 3 directions, forming a solid green body within the loose powdered bed without significant shrinkage and with a lower application of energy than would be required to melt or sinter the metal in the powder bed. After the energy source is removed or otherwise is no longer applied to the build material, the polymer may solidify without a need for drying. In some embodiments, a gas flow may be passed over or through the powdered bed to speed the process of solidification of the polymer.

The above-described process may continue until the build volume is full and each part is completely bound into a green body by repeatedly lowering the platform 131 after a layer is fabricated, depositing additional build material with the roller 125 (which may comprise raising the piston 121), applying energy, etc.

According to some embodiments, the build material 130 may comprise a metal powder such as, but not limited to, stainless steel powder (e.g., 17-4PH, 316L), carbon steel powder (e.g., AISI 4140), copper powder, tool steel powder (e.g., H13), superalloy powder (e.g., Iconel 625), titanium powder, aluminum, magnesium, or combinations thereof. In some embodiments, the metal powder may comprise, or may consist essentially of, spherical metal particles. In some embodiments, metal powder particles may have a diameter of greater than or equal to 1 µm, 5 µm, 10 µm or 20 µm. In some embodiments, the metal powder particles may have a diameter of less than or equal to 100 µm, 50 µm, 25 µm, 10 µm or 5 µm. Any suitable combinations of the above-referenced ranges are also possible (e.g., a diameter of greater or equal to 5 µm and less than or equal to 10 µm).

According to some embodiments, the build material 130 may comprise one or more polymers. A polymer may in some cases be provided as discontinuous particles that have a size similar to that of the metal particles and/or may be provided as much smaller particles that coat the metal particles. Polymer particles that coat the metal particles may exhibit a uniform thickness over the metal particle surface and/or may be continuous in that they effectively fully encapsulate the metal particles. In some embodiments, polymer particles may adhere to the metal particles through mechanical sticking such as adhesion, and/or by clinging to the metal particles through a static charge. In some embodiments, polymer particles may flow with the metal particles, which may be beneficial for increasing the ability of the build material to be spread and to pack evenly.

According to some embodiments, a ratio of metal volume to polymer volume may be between 5:1 and 10:1, or may be between 10:1 and 100:1, or may be between 50:1 and 200:1, or may be between 50:1 and 1000:1, or may be between 200:1 and 500:1. Suitable polymers may include, but are not limited to, a wax (e.g., polypropylene, polyethylene or paraffin), a polyolefin (e.g., LDPE, HDPE, or atactic polypropylene), a copolymer (e.g., EVA, ethylene or vinyl acetate), polyamides, polyesters, thermoplastic polyurethane, styrene block copolymers, polyoxymethylene (POM), or combinations thereof. In some embodiments, polymer particles may have a diameter of greater than or equal to 10 nm, 50 nm, 100 nm or 200 nm. In some embodiments, the polymer particles may have a diameter of less than or equal to 1 µm, 500 nm, 100 nm, 50 nm, 20 nm or 10 nm. Any suitable combinations of the above-referenced ranges are also possible (e.g., a diameter of greater or equal to 10 nm and less than or equal to 50 nm).

According to some embodiments, the build material 130 may comprise one or more additives, such as but not limited to one or more flow improvers and/or pigments. Pigments (e.g., carbon black) within the build material may adjust the extent to which the build material absorbs energy from the energy source 115. For instance, since the metal powder is typically expected to be reflective of light, configuring the polymer to be absorbing (e.g., black) via the inclusion of one or more pigments may help to direct energy to the polymer and to thereby lower the power of the energy source necessary to produce the desired effect(s) in the polymer. Flow improvers (e.g., fumed silica) may adjust the flowability and/or packing density of the build material.

Although energy source 115 is depicted as a single beam in the example of FIG. 1, numerous different techniques may be envisioned to direct energy to the build material in a manner sufficient to locally cause polymer in the build material to adhere to other regions of polymer and/or to the metal. In some embodiments, the energy source may comprise a laser or electron beam configured to be directed onto the surface of the build material. In some embodiments, the energy source 115 may be optically coupled to one or more scanning systems such as one or more mechanical gantries, linear scanning devices using polygonal mirrors, and/or galvanometer-based scanning devices.

Figure 12:
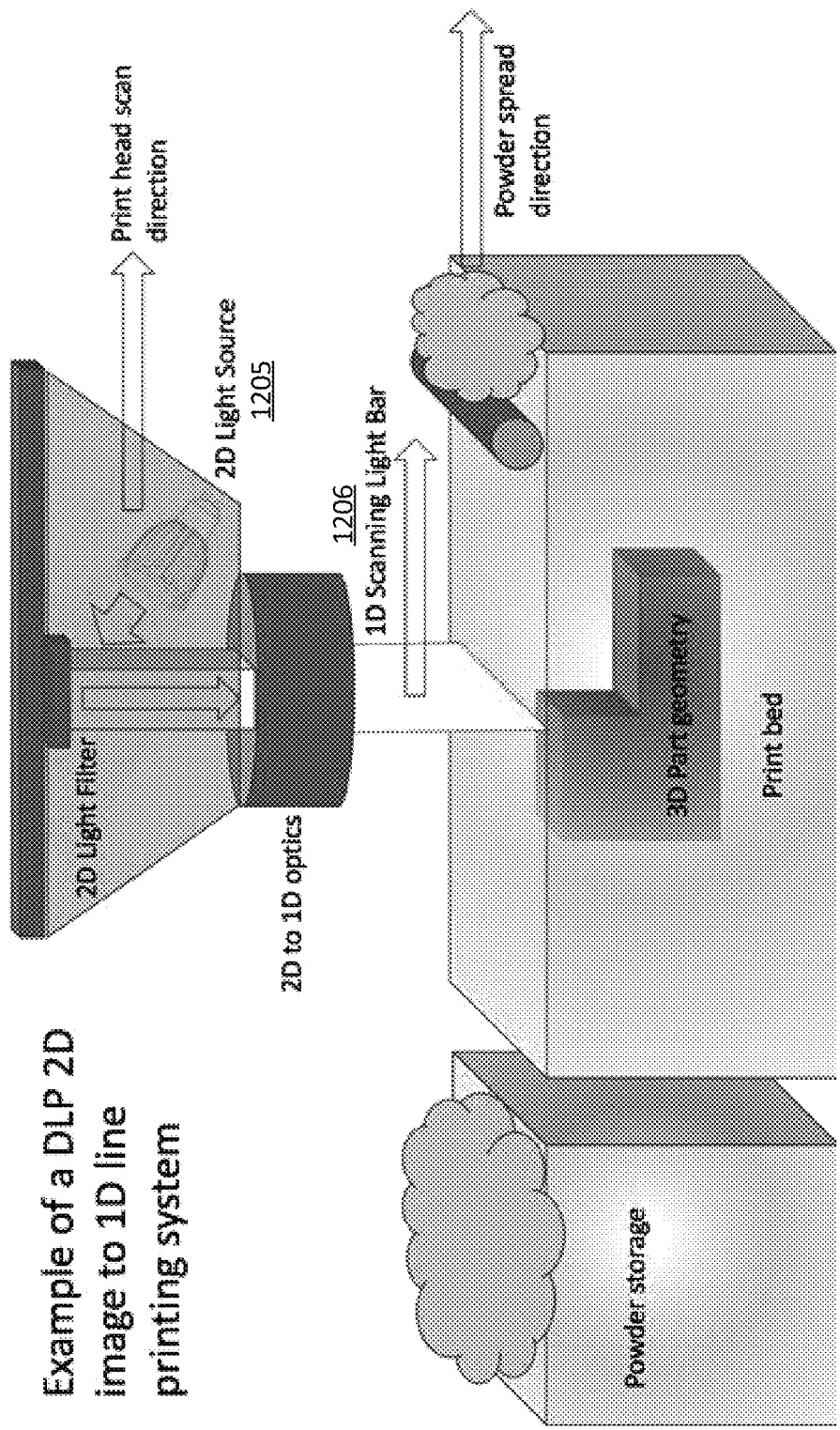
FIG. 12 illustrates an additive fabrication device comprising a scanning light bar suitable for practicing aspects of the present application, according to some embodiments.

In some embodiments, the energy source 115 may comprise a digital (e.g., Digital Light Processing (DLP)) projector, an LED array, a light bar, an LCD filter and a light source, or combinations thereof. In the case of a DLP or other projector, in some implementations a two-dimensional array of pixels may be converted into a one-dimensional row of pixels using suitable optical components so that the total light power produced by each row is instead produced as a single pixel. For instance, a 1920×2160 pixel projector may produce a single row of 1920 pixels by concentrating the light from each row of 2160 pixels into a single pixel. The one-dimensional row of pixels may be scanned over the surface of the build material or otherwise directed to the build material to apply energy to the build material at selected locations across the surface. An example of such an energy source is depicted in FIG. 12, in which a two-dimensional light source 1205 is passed through optical components 1206 that transform the light into a one-dimensional row of pixels. It may be noted that, in this approach, the brightness of each of the pixels in the one-dimensional row may be adjusted by changing the number of illuminated pixels within each row and/or by adjusting the brightness of each illuminated pixel. Thus, when a row of 2160 pixels is concentrated into a single pixel, the brightness of that pixel may be adjusted (e.g., from 100% intensity at 2160 fully illuminated pixels, to 50% intensity at 1080 fully illuminated pixels, to 10% intensity at 216 fully illuminated pixels, etc.).

Figure 2:
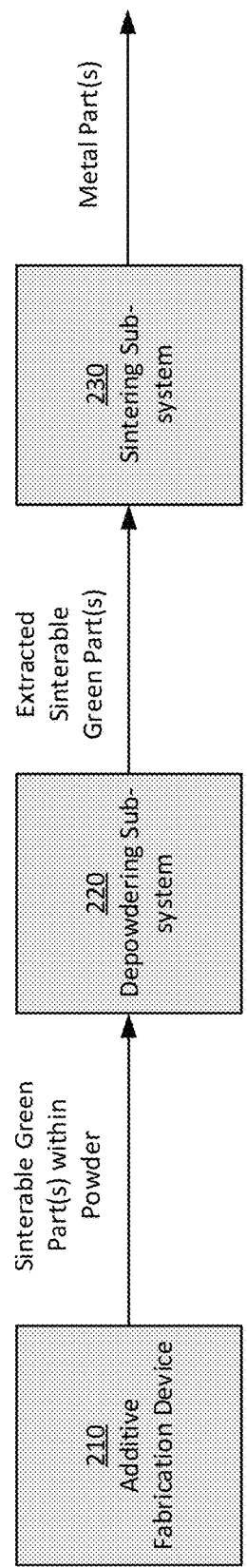
FIG. 2 is a flowchart of a method of producing metal parts by first fabricating sinterable metallic green parts, according to some embodiments.

FIG. 2 is a flowchart of a method of producing metal parts by first fabricating sinterable metallic green parts, according to some embodiments. As discussed above, parts produced by additive fabrication device 100 may be sinterable metallic green parts in that they contain the polymer of the build material in addition to the metal powder. Method 200 depicts the full build process in which the green parts may be converted into metal parts.

In the example of FIG. 2, an additive fabrication device 210 (e.g., device 100 shown in FIG. 1) fabricates sinterable metallic green part(s) as discussed above. Subsequent to fabrication, the build region of the additive fabrication device may be removed from the device so another build can continue. In some cases, the build region may be contained within a box (a "build box"). Within depowdering sub-system 220, the build box may be excavated, the green parts recovered and untouched powder is recovered and recycled, without the need for further drying. Depowdering sub-system 220 may comprise various tools to aid in removal of powder without damaging the green part(s), such as vacuum systems, air jets, vibrating platforms or combinations thereof, and may include any number of manual or automatic operations that remove powder from the parts.

Once the green parts are extracted from the powder, they are provided to sintering sub-system 230 which applies sufficient heat to the green parts to burn away the polymer (and any other non-metal components) to leave a fully dense metal part.

Figure 3:
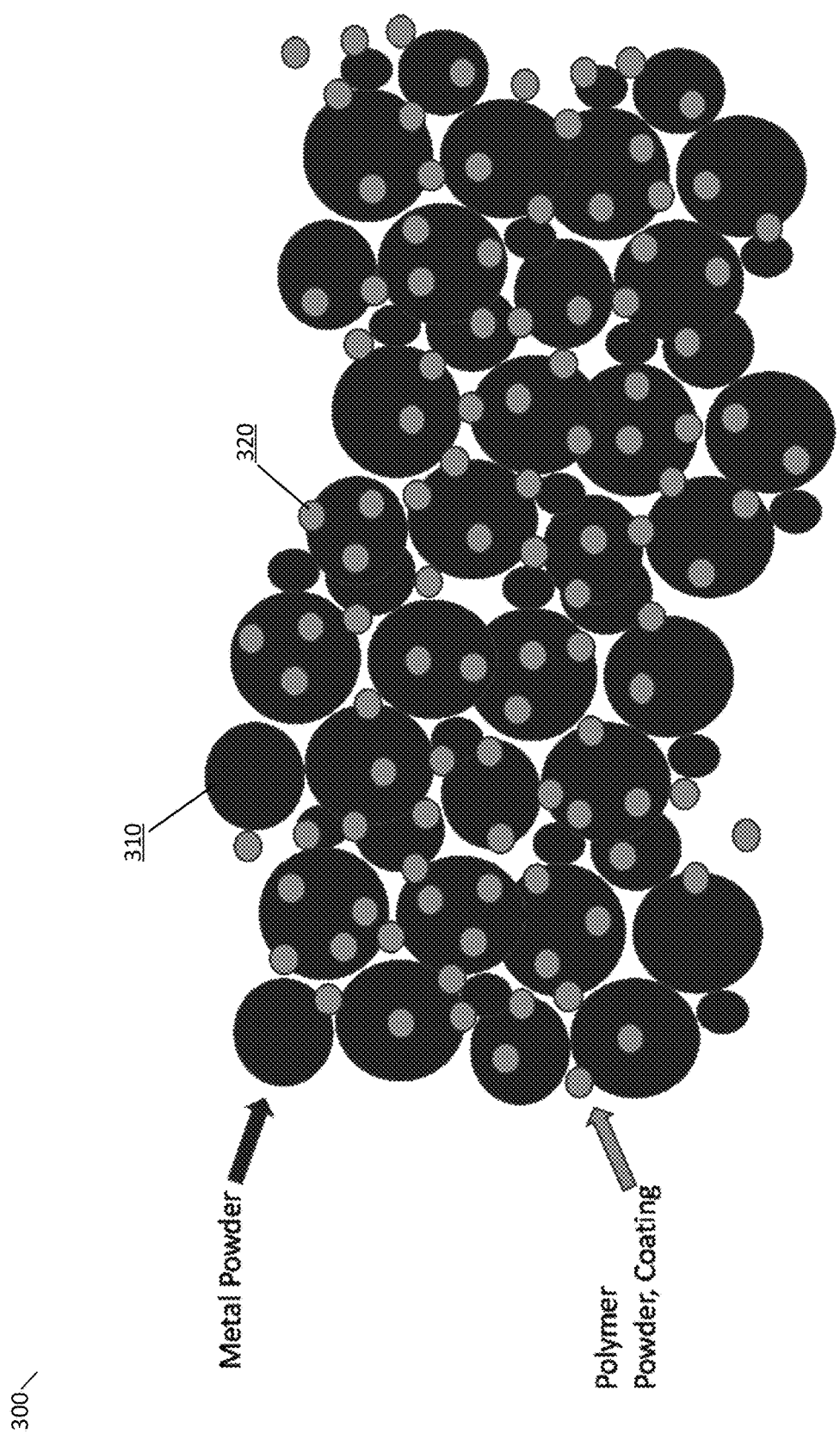
FIG. 3 depicts an illustrative build material comprising metal powder and a polymer, according to some embodiments.

FIG. 3 depicts an illustrative build material comprising metal powder and polymer, according to some embodiments. Illustrative build material 300 includes metal powder particles (e.g., particle 310) in dark grey and polymer particles (e.g., particle 320) in light grey. The illustrated metal powder particles include both spherical particles and some ellipsoid particles.

FIGS. 4A-4D are photographs of a build material in which metal powder particles are coated with polymer, according to some embodiments. Each of FIGS. 4A, 4B, 4C and 4D are photographs of metal powder particles (the large, roughly spherical objects) coated with a polymer, which appears in the photographs as a dusty material coating the metal particles. A 30 µm scale is shown for reference. As may be noted the diameter of the polymer particles comprising the coating in these examples may be on the order of tens of nanometers.

Such as polymer coating is further illustrated in FIGS. 5A and 5B, which contrast metal powder particles with and without a polymer coating, according to some embodiments. FIG. 5A is a photograph of metal powder particles without a polymer present. Subsequently a polymer may be mixed with the metal powder of FIG. 5A, causing coating of the metal powder particles with the polymer and producing the coated particles shown in FIG. 5B.

Figure 6:
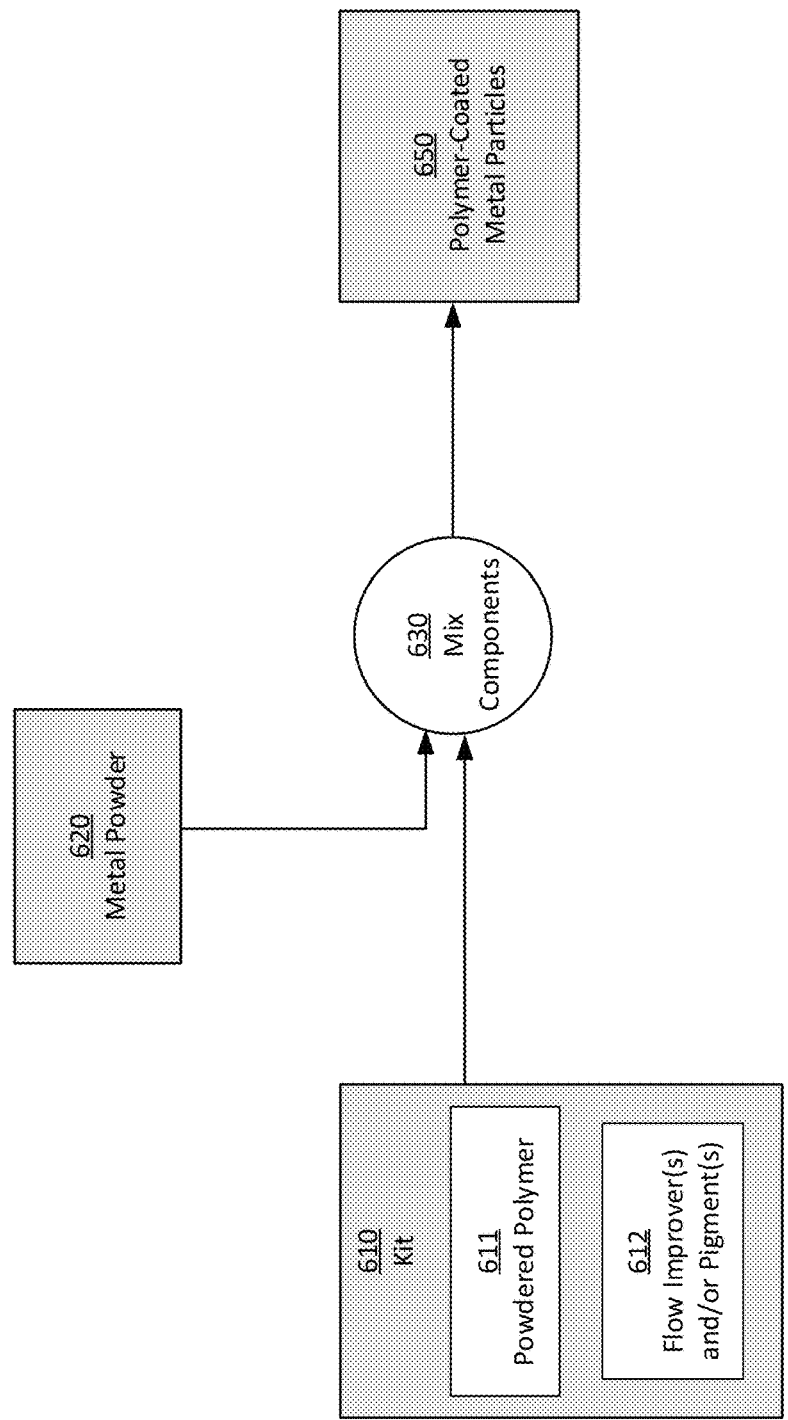
FIG. 6 is a flowchart of a method of preparing a build material comprising polymer-coated metal particles, according to some embodiments.

FIG. 6 is a flowchart of a method of preparing a build material comprising polymer-coated metal particles, according to some embodiments. In method 600, a kit 610 for producing a build material is provided and comprises a powdered polymer 611 and one or more flow improvers and/or pigments 612. The powdered polymer, flow improvers and pigments may be configured in any of the manners discussed above in relation to FIG. 1 with respect to the polymer, flow improvers and pigments of build material 130.

In act 630, the contents of the kit are mixed with a metal powder 620, which may be configured in any of the manners discussed above in relation to FIG. 1 with respect to the metal powder of build material 130. Mixing of the kit 610 and metal powder 620 may be performed manually through combination of the components and applying motion to a container (e.g., shaking, vibration, etc.) and/or automatically by a device that performs mixing of the components by, for example, moving a blade through the mixture to evenly distribute the components. The result of the mixing in act 630 is a build material comprising polymer-coated metal particles 650.

Figure 7:
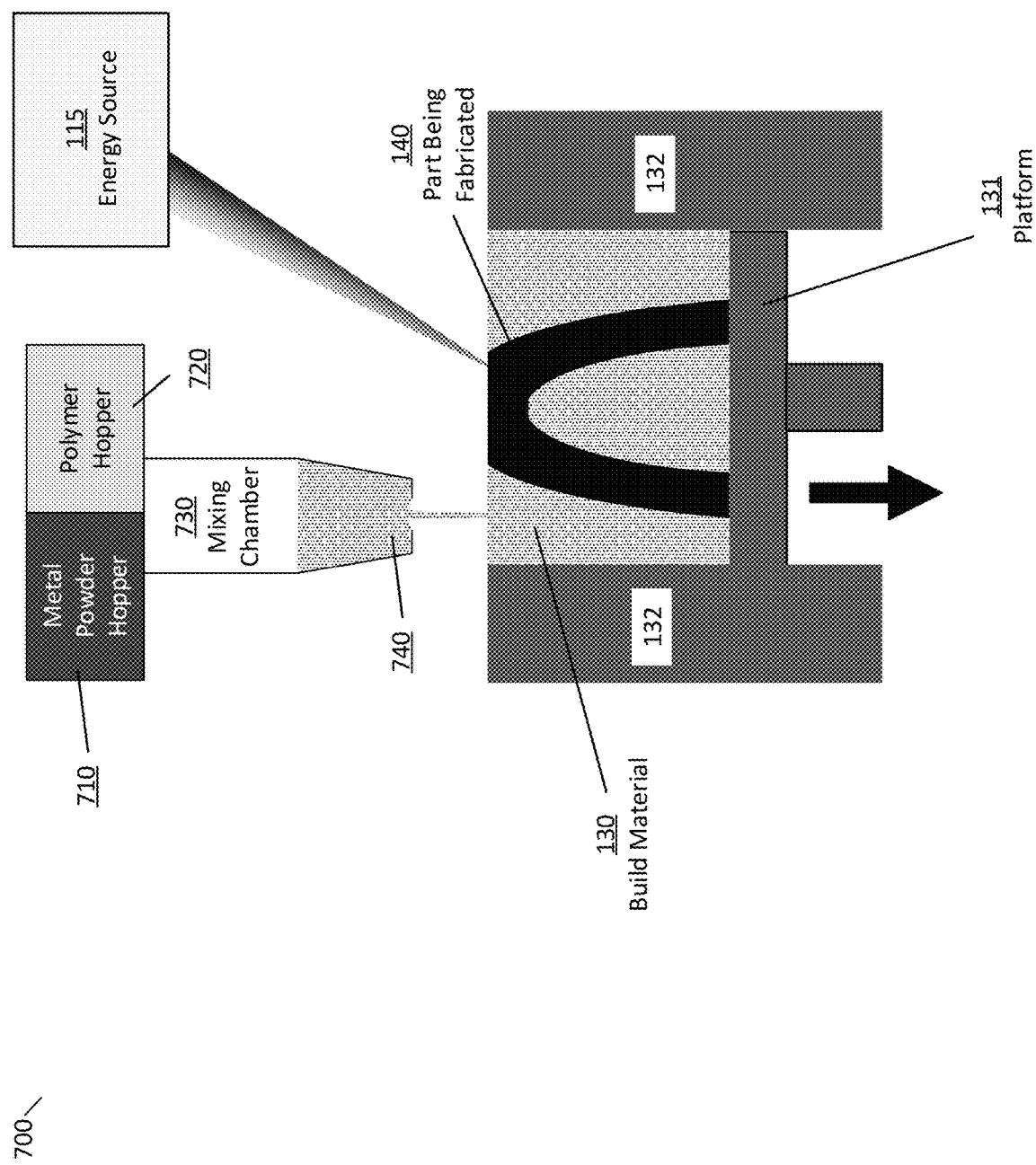
FIG. 7 illustrates an additive fabrication device in which a build material is produced by mixing a metal powder with a polymer within the device, according to some embodiments.

FIG. 7 illustrates an additive fabrication device in which a build material is produced by mixing a metal powder with a polymer within the device, according to some embodiments. Additive fabrication device 700 provides one example of automatically mixing a polymer with a metal powder within the device 100 of FIG. 1, and dispenses the material over the build platform as an alternative to using the powder delivery system 120 shown in FIG. 1. In the example of FIG. 7, components labeled with the same number as those components in FIG. 1 are intended to be as described in the context of FIG. 1.

Additive fabrication device 700 includes a build material dispenser 740 which includes two hoppers 710 and 720 for holding a metal powder and a polymer, respectively. Additives such as flow improver and/or pigment may optionally be included within one or both of the hoppers 710 and 720, or may be provided in an additional hopper not illustrated. Material from the hoppers enters mixing chamber 730, which contains moveable components for producing a substantially uniform mixture of the materials. In some embodiments, the mixing chamber 730 may comprise one or more mixing blades configured to move (e.g., rotate about an axis and/or move parallel to the axis) to mix the components.

Figure 8:
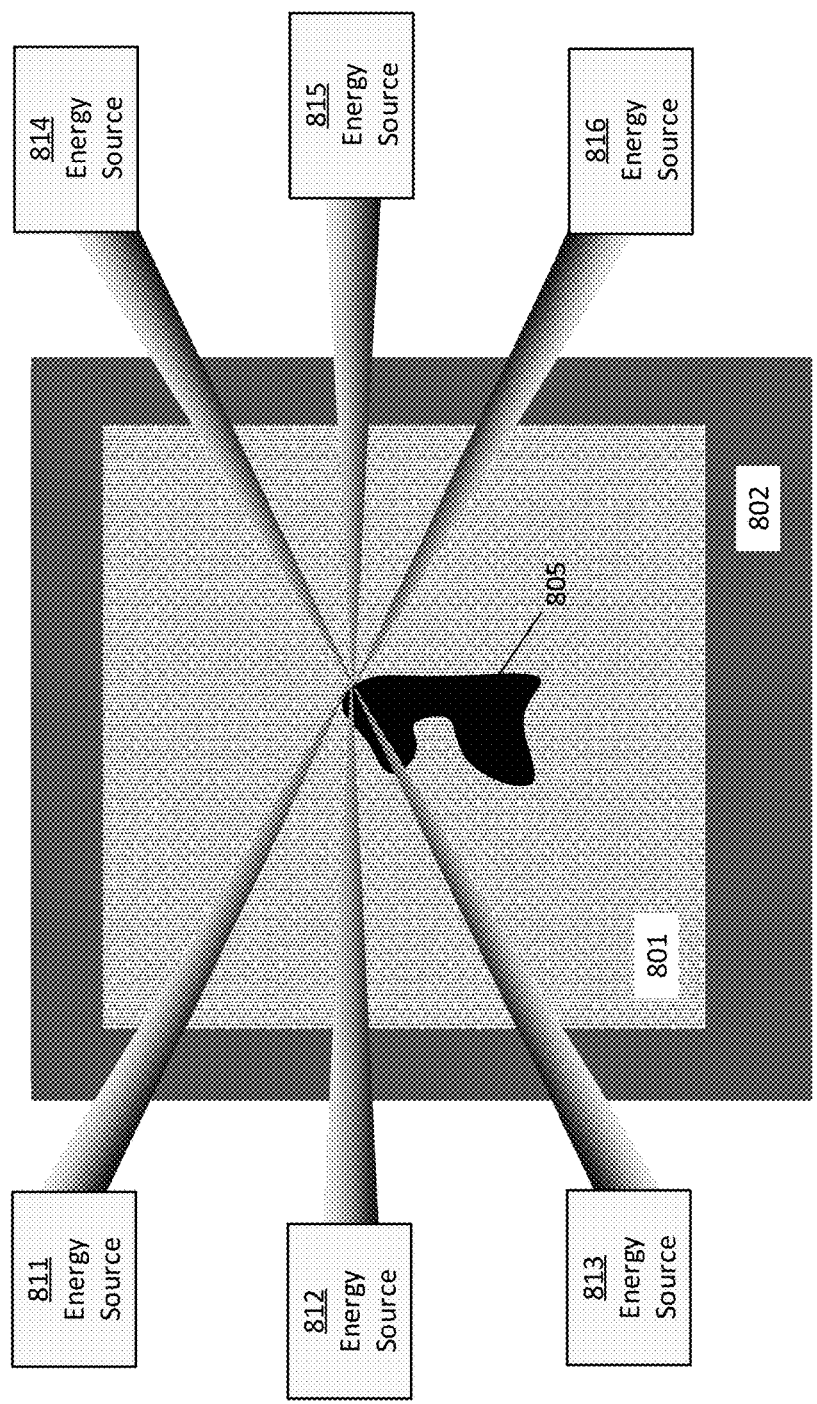
FIG. 8 illustrates a technique for directing energy to a desired location within a three-dimensional volume by constructively interfering radiation from multiple energy sources, according to some embodiments.

FIG. 8 illustrates a technique for directing energy to a desired location within a three-dimensional volume by constructively interfering radiation from multiple energy sources, according to some embodiments. Additive fabrication device 800 may, in contrast to additive fabrication device 100 shown in FIG. 1, produce parts from a volume of encased build material rather than by forming material of the part in discretely deposited layers of build material.

In the example of FIG. 8, build material 801 is arranged enclosed within a build box 802 prior to fabricating any regions of any parts. Subsequently, energy sources 811-816 may be directed through the build volume such that the energy constructively interferes at a desired location within the three-dimensional build volume. The additive fabrication device may thereby control the timing and/or phase of radiation produced by the energy sources in addition to the direction of propagation along multiple axes.

In the example of FIG. 8, a single one of the energy sources 811-816 may not produce a sufficient energy to cause adhesion of polymer within the build material to other regions of polymer and/or to metal particles. However, by constructively interfering multiple energy sources, a sufficiently high energy density may be produced in a desired location to cause such adhesion. In some embodiments, the energy sources 811-816 may produce radiation capable of propagating through the build volume and the build box 802, such as x-rays.

Figure 9:
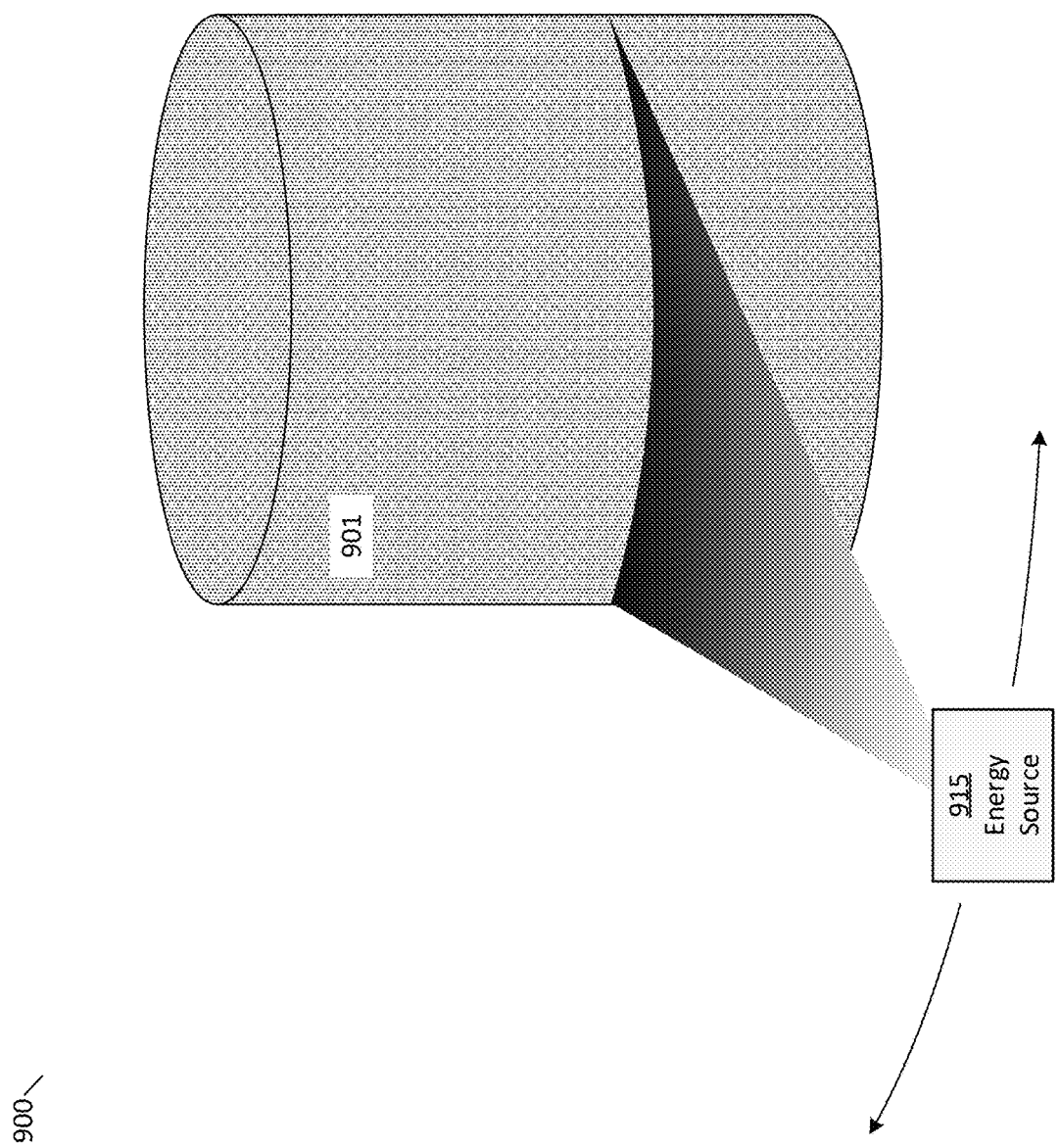
FIG. 9 illustrates a technique for directing energy to desired locations within a three-dimensional volume by projecting an image along an axis, according to some embodiments.

FIG. 9 illustrates a technique for directing energy to desired locations within a three-dimensional volume by projecting an image along an axis, according to some embodiments. Additive fabrication device 900 may, in contrast to additive fabrication device 100 shown in FIG. 1, produce parts from a volume of encased build material rather than by forming material of the part in discretely deposited layers of build material.

In the example of FIG. 9, a build volume containing build material 901 is shown. The build material 901 is arranged enclosed within a build box prior to fabricating any regions of any parts; for clarity this build box is not shown in FIG. 9. Subsequently, energy source 915 projects energy as a one-dimensional image in a first direction such that the energy passes through the build material 901. Energy source 915 may be, for example, a source of x-rays. In some embodiments, the energy source 915 may then move relative to the build volume, through movement of the energy source around the build volume and/or by rotation of the build volume and again project energy as another one-dimensional image, but along a second direction different from the first direction. By repeating this process whilst projecting appropriate images in each direction, energy may be deposited more in some locations than others within the three-dimensional build volume such that in those locations there is sufficiently high energy density to cause adhesion of polymer within the build material to other regions of polymer and/or to metal particles. In some embodiments, multiple energy sources may simultaneously project energy as one-dimensional images in multiple directions (along multiple axes) at the same time.

Figure 10:
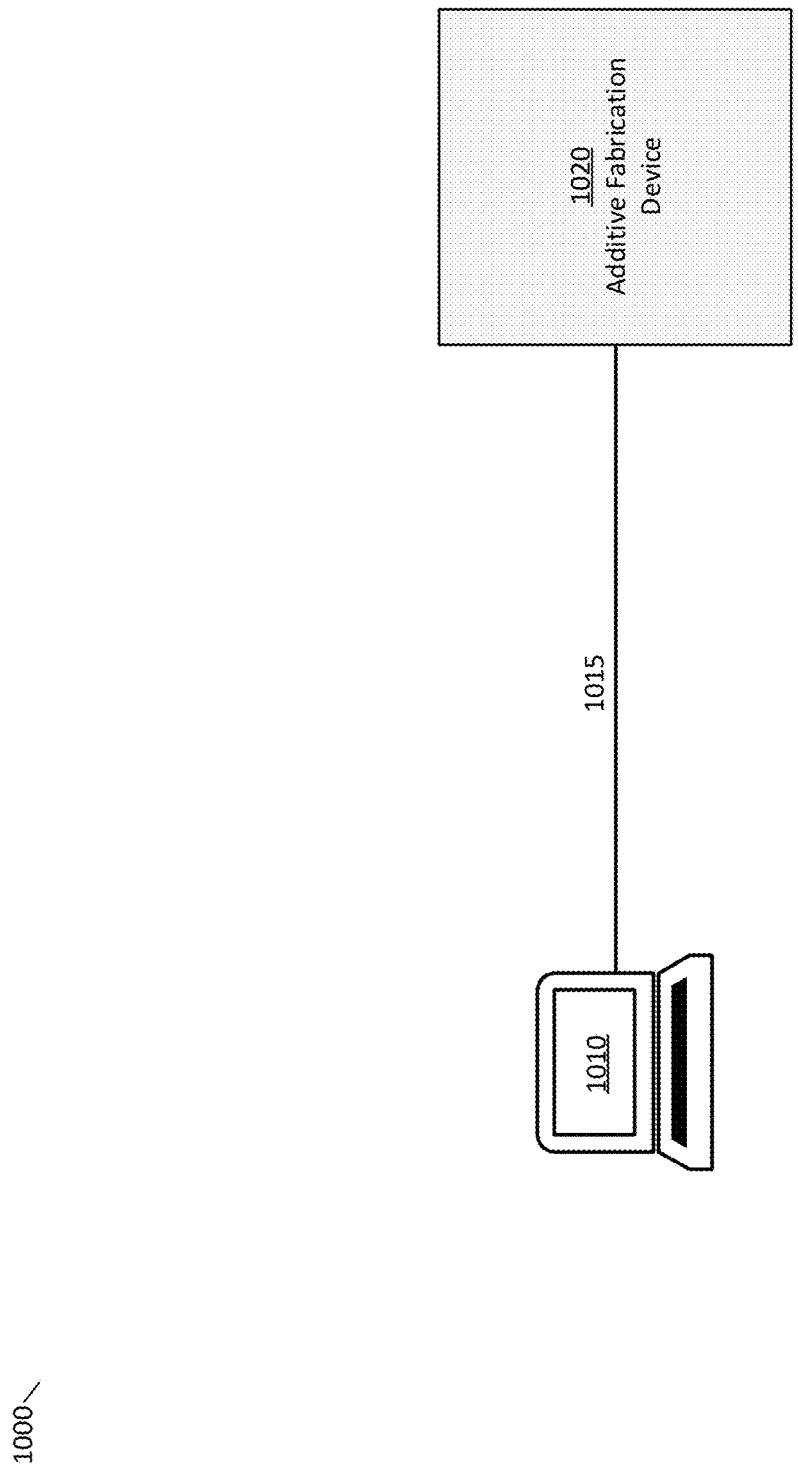
FIG. 10 is a block diagram of a system suitable for practicing aspects of the invention, according to some embodiments.

FIG. 10 is a block diagram of a system suitable for practicing aspects of the invention, according to some embodiments. System 1000 illustrates a system suitable for generating instructions to perform additive fabrication by an additive fabrication device and subsequent operation of the additive fabrication device to fabricate a part. For instance, instructions to direct energy onto a build material as described by the various techniques above may be generated by the system and provided to the additive fabrication device. Various parameters associated with application of directed energy may be stored by system computer system 1010 and accessed when generating instructions for the additive fabrication device 1020 to fabricate parts. For example, parameters associated with particular metal powders and/or particular polymers as components of a build material may be accessed by the computer system 1010 to determine a suitable amount of directed energy to the build material at particular wavelength(s) of light, with a particular energy density, at a particular speed, etc. and the instructions generated according to the determined quantities.

According to some embodiments, computer system 1010 may execute software that generates two-dimensional layers that may each comprise sections of a part. Instructions may then be generated from this layer data to be provided to an additive fabrication device, such as additive fabrication device 1020, that, when executed by the device, fabricates the layers and thereby fabricates the object. Such instructions may be communicated via link 1015, which may comprise any suitable wired and/or wireless communications connection. In some embodiments, a single housing holds the computing device 1010 and additive fabrication device 1020 such that the link 1015 is an internal link connecting two modules within the housing of system 1000.

Figure 11:
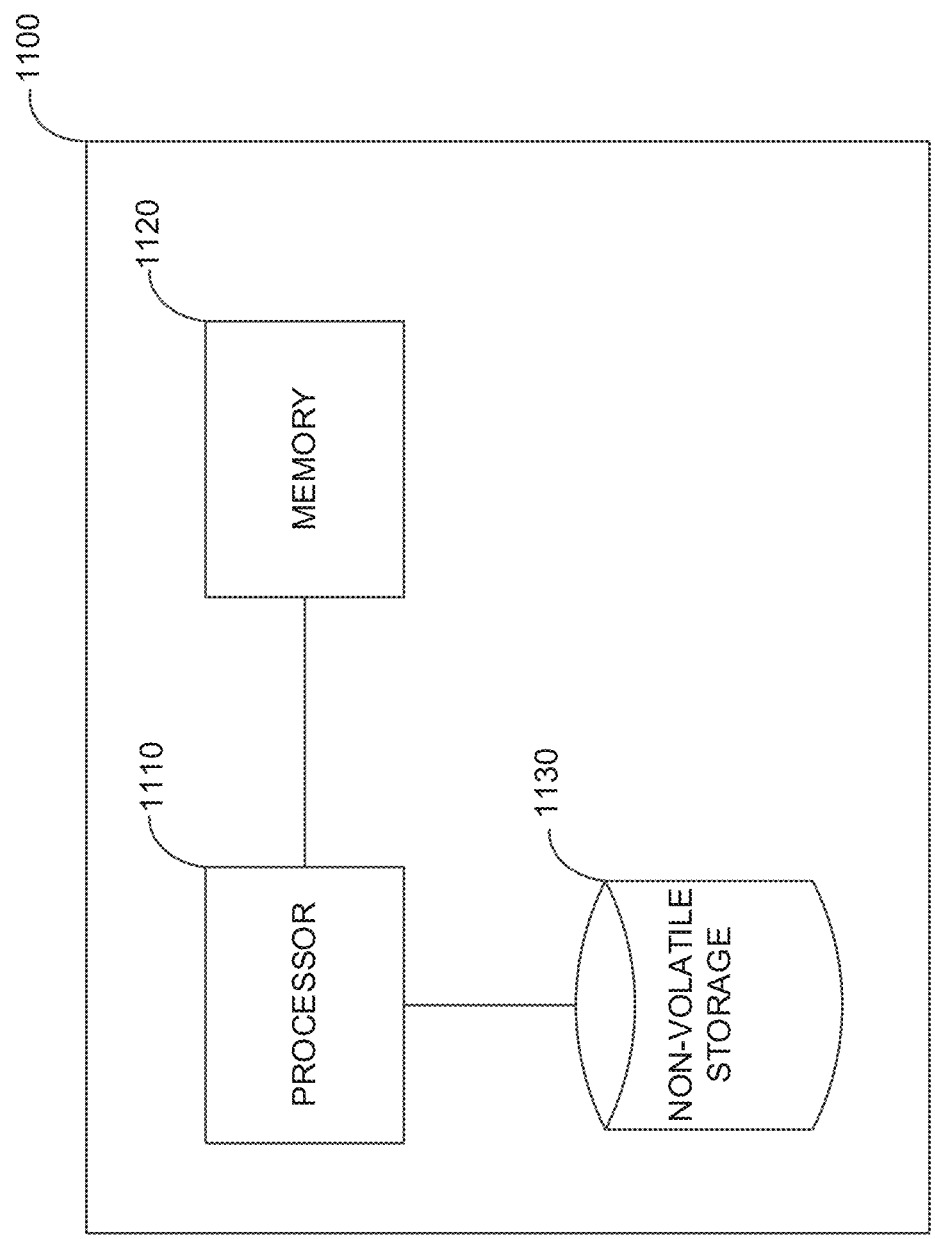
FIG. 11 illustrates an example of a computing system environment on which aspects of the present application may be implemented.

An illustrative implementation of a computer system 1100 that may be used to perform any of the aspects of fabricating sinterable metallic parts through the application of directed energy to a build material is shown in FIG. 11. The computer system 1100 may include one or more processors 1110 and one or more non-transitory computer-readable storage media (e.g., memory 1120 and one or more non-volatile storage media 1130). The processor 1110 may control writing data to and reading data from the memory 1120 and the non-volatile storage device 1130 in any suitable manner, as the aspects of the invention described herein are not limited in this respect. To perform functionality and/or techniques described herein, the processor 1110 may execute one or more instructions stored in one or more computer-readable storage media (e.g., the memory 1120, storage media, etc.), which may serve as non-transitory computer-readable storage media storing instructions for execution by the processor 1110.

In connection with techniques described herein, code used to, for example, generate instructions that, when executed, cause an additive fabrication device to fabricate a part, control one or more energy sources to direct energy onto a build material, move a roller to distribute build material, automatically mix build material, etc. may be stored on one or more computer-readable storage media of computer system 1100. Processor 1110 may execute any such code to provide any techniques for fabricating sinterable metallic parts through the application of directed energy to a build material as described herein. Any other software, programs or instructions described herein may also be stored and executed by computer system 1100. It will be appreciated that computer code may be applied to any aspects of methods and techniques described herein. For example, computer code may be applied to interact with an operating system to transmit instructions to an additive fabrication device through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method of fabricating an object via additive fabrication, the method comprising:
   depositing a build material into a build region of an additive fabrication device, the build material comprising metal particles and polymer particles adhered to the metal particles, wherein the polymer particles comprise a wax; and
   directing, by the additive fabrication device, energy onto the deposited build material to cause at least some of the polymer particles to melt and adhere to other portions of the polymer particles and/or the metal particles, without sintering the metal particles.

2. The method of claim 1, wherein directing said energy onto the deposited build material causes the at least some of the polymer particles to undergo heat-induced polymerization.

3. The method of claim 1, wherein the polymer particles comprise one or more thermoplastics.

4. The method of claim 1, wherein the polymer particles comprise polypropylene, polyethylene, and/or paraffin.

5. The method of claim 1, wherein the polymer particles comprise one or more copolymers.

6. The method of claim 1, further comprising fabricating a sinterable metallic part through repetition of the acts of depositing build material and directing energy onto the build material.

7. The method of claim 6, further comprising sintering the sinterable metallic part in a furnace.

8. The method of claim 1, wherein directing energy onto the deposited build material comprises directing radiation from a laser onto the deposited build material.

9. The method of claim 8, wherein the radiation produced by the laser comprises visible light.

10. The method of claim 1, wherein directing energy onto the deposited build material comprises directing an x-ray beam onto the deposited build material.

11. The method of claim 1, wherein directing energy onto the deposited build material comprises directing an array of light sources onto the deposited build material.

12. The method of claim 1,
wherein depositing the build material into the build region comprises filling a build volume with the build material, and
wherein directing energy onto the deposited build material comprises directing a plurality of energy sources onto the deposited build material to cause the at least some of the polymer particles to adhere to other portions of the polymer particles and/or the metal in locations in which the plurality of energy sources constructively interfere with one another.

13. The method of claim 1,
wherein depositing the build material into the build region comprises filling a build volume with the build material, and
wherein directing energy onto the deposited build material comprises projecting a plurality of images through the build volume along different axes.

14. The method of claim 13, wherein projecting a plurality of images through the build volume along different axes comprises projecting one or more of the plurality of images simultaneously through the build volume.

15. The method of claim 1, wherein the build material further comprises one or more flow improvers.

* * * * *